US009135563B2

(12) United States Patent
Osogami et al.

(10) Patent No.: US 9,135,563 B2
(45) Date of Patent: *Sep. 15, 2015

(54) USING CYCLIC MARKOV DECISION PROCESS TO DETERMINE OPTIMUM POLICY

(75) Inventors: Takayuki Osogami, Tokyo (JP); Raymond H. Rudy, Tokyo (JP)

(73) Assignee: International Business Machines Corporation, Armonk, NY (US)

(*) Notice: Subject to any disclaimer, the term of this patent is extended or adjusted under 35 U.S.C. 154(b) by 306 days.

This patent is subject to a terminal disclaimer.

(21) Appl. No.: 13/586,385

(22) Filed: Aug. 15, 2012

(65) Prior Publication Data

US 2013/0085983 A1 Apr. 4, 2013

(30) Foreign Application Priority Data

Sep. 30, 2011 (JP) .................................. 2011-218556

(51) Int. Cl.
*G06N 99/00* (2010.01)
*G06N 7/00* (2006.01)

(52) U.S. Cl.
CPC .............. *G06N 7/005* (2013.01); *G06N 99/005* (2013.01)

(58) Field of Classification Search
None
See application file for complete search history.

(56) References Cited

FOREIGN PATENT DOCUMENTS

JP 2005084834 A 3/2005
JP 2011022902 A 2/2011

OTHER PUBLICATIONS

Hansen, E., et al. "LAO: A heuristic search algorithm that finds solutions with loops." Artificial Intelligence vol. 129 No. 1 (2001): pp. 35-62.*
Song, H., et al. "Optimal electricity supply bidding by Markov decision process." Power Systems, IEEE Transactions on vol. 15 No. 2 (2000): pp. 618-624.*
Hansen, E., et al. "LAO: A heuristic search algorithm that finds solutions with loops." Artificial Intelligence 129.1 (2001): 35-62.*
Noutsos, D. "Perron Frobenius theory and some extensions." Department of Mathematics, University of Ionnina, Greece (2008). [Retrieved from math.uoi.gr].*
Sonnenberg, F., et al. "Markov models in medical decision making a practical guide." Medical decision making 13.4 (1993): 322-338.*
J. Lambert, et al., "A policy iteration algorithm for Markov decision processes skip-free in one direction", Proceedings of the 2nd international conference on Performance evaluation methodologies and tools, Article No. 75, SMC tools, 2007, pp. 1-3.
Martin L. Puterman, "Markov Decision Processes: Discrete Stochastic Dynamic Programming," Wiley, 1994; pp. 377-384 and 451-462.

* cited by examiner

*Primary Examiner* — Kakali Chaki
*Assistant Examiner* — Eric Nilsson
(74) *Attorney, Agent, or Firm* — Cantor Colburn LLP

(57) ABSTRACT

A method for determining an optimum policy by using a Markov decision process in which T subspaces each have at least one state having a cyclic structure includes identifying, with a processor, subspaces that are part of a state space; selecting a t-th (t is a natural number, t≤T) subspace among the identified subspaces; computing a probability of, and an expected value of a cost of, reaching from one or more states in the selected t-th subspace to one or more states in the t-th subspace in a following cycle; and recursively computing a value and an expected value of a cost based on the computed probability and expected value of the cost, in a sequential manner starting from a (t−1)-th subspace.

6 Claims, 4 Drawing Sheets

| PROBLEM | NUMBER OF STATES × NUMBER OF STATE-ACTION PAIRS | LINEAR PROGRAMMING CPLEX | POLICY ITERATION | METHOD ACCORDING TO PRESENT EMBODIMENT | INCREASE IN SPEED |
|---|---|---|---|---|---|
| 1 | 1930×2240 | 0.20 SECONDS | 1.64 SECONDS | 0.26 SECONDS | 6.3-FOLD |
| 2 | 6082×16502 | 123 SECONDS | 20.2 SECONDS | 1.98 SECONDS | 10.2-FOLD |
| 3 | 13010×40460 | 2614 SECONDS | 91.7 SECONDS | 6.60 SECONDS | 13.8-FOLD |
| 4 | 25891×85030 | 94796 SECONDS | 176 SECONDS | 16.2 SECONDS | 10.8-FOLD |
| 5 | 52090×175930 | — | 684 SECONDS | 37.4 SECONDS | 18.3-FOLD |
| 6 | 104490×357730 | — | 5017 SECONDS | 66.4 SECONDS | 75.5-FOLD |
| 7 | 209290×721330 | — | 20078 SECONDS | 197 SECONDS | 101-FOLD |

USING CYCLIC MARKOV DECISION PROCESS TO DETERMINE OPTIMUM POLICY

PRIORITY

This application claims priority to Japanese Patent Application No. 2011-218556, filed 30 Sep. 2011, and all the benefits accruing therefrom under 35 U.S.C. §119, the contents of which in its entirety are herein incorporated by reference.

BACKGROUND

The present disclosure relates to a method, an apparatus, and a computer program for using a cyclic Markov decision process to determine, with reduced computational processing load, an optimum policy that minimizes an average cost.

A method of solving a control problem that is formulated as the so-called "Markov decision process" is one of the techniques that can be applied to a wide variety of fields, such as robotics, power plants, factories, and railroads, to solve autonomous control problems in those fields. In a "Markov decision process", a control problem of a state transition that is dependent on time of an event is solved by using the distance (cost) from an ideal state transition as the evaluation criterion.

For example, JP2011-022902A discloses an electric power transaction management system which manages automatic electric power interchange at power generating and power consumption sites such as minimal clusters including equipment, such as a power generator, an electric storage device, and electric equipment, and power router and uses a Markov decision process to determine an optimum transaction policy. JP2005-084834A discloses an adaptive controller that uses a Markov decision process in which a controlled device transitions to the next state according to a state transition probability distribution. The controller is thus caused to operate as a probabilistic controller in order to reduce the amount of computation in algorithms such as dynamic programming algorithms in which accumulated costs are computed and exhaustive search algorithms in which a policy is directly searched for.

Other approaches that use Markov decision processes to determine optimum policies include value iteration, policy iteration, and so-called linear programming, which is disclosed in JP2011-022902A. In the case of a Markov decision process that has a special structure, the special structure itself is used to efficiently determine an optimum policy as disclosed in JP2005-084834A.

SUMMARY

In one embodiment, a method for determining an optimum policy by using a Markov decision process in which T subspaces each have at least one state having a cyclic structure includes identifying, with a processor, subspaces that are part of a state space; selecting a t-th (t is a natural number, $t \le T$) subspace among the identified subspaces; computing a probability of, and an expected value of a cost of, reaching from one or more states in the selected t-th subspace to one or more states in the t-th subspace in a following cycle; and recursively computing a value and an expected value of a cost based on the computed probability and expected value of the cost, in a sequential manner starting from a (t−1)-th subspace.

In another embodiment, an apparatus for determining an optimum policy by using a Markov decision process in which T subspaces each have at least one state having a cyclic structure includes a processor implemented subspace identifying unit that identifies subspaces that are part of a state space; a processor implemented election unit that selects the t-th (t is a natural number, $t \le T$) subspace among the identified subspaces; a processor implemented probability and cost computing unit that computes a probability of, and an expected value of a cost of, reaching from one or more states in the selected t-th subspace to one or more states in the t-th subspace in a following cycle; and a processor implemented recursive computing unit that recursively computes a value and an expected value of a cost based on the computed probability and expected value of the cost, in a sequential manner starting from a (t−1)-th subspace.

In another embodiment, a computer program product includes a computer readable storage medium having computer readable code stored thereon that, when executed by a computer, implement a method for determining an optimum policy by using a Markov decision process in which T subspaces each have at least one state having a cyclic structure. The method includes identifying, with a processor, subspaces that are part of a state space; selecting a t-th (t is a natural number, $t \le T$) subspace among the identified subspaces; computing a probability of, and an expected value of a cost of, reaching from one or more states in the selected t-th subspace to one or more states in the t-th subspace in a following cycle; and recursively computing a value and an expected value of a cost based on the computed probability and expected value of the cost, in a sequential manner starting from a (t−1)-th subspace.

BRIEF DESCRIPTION OF THE DRAWINGS

FIG. 4 is a table for comparison of computational processing times required for obtaining an optimum policy using a Markov decision process on the information processing apparatus according to an embodiment of the present disclosure.

DETAILED DESCRIPTION

Figure 1:
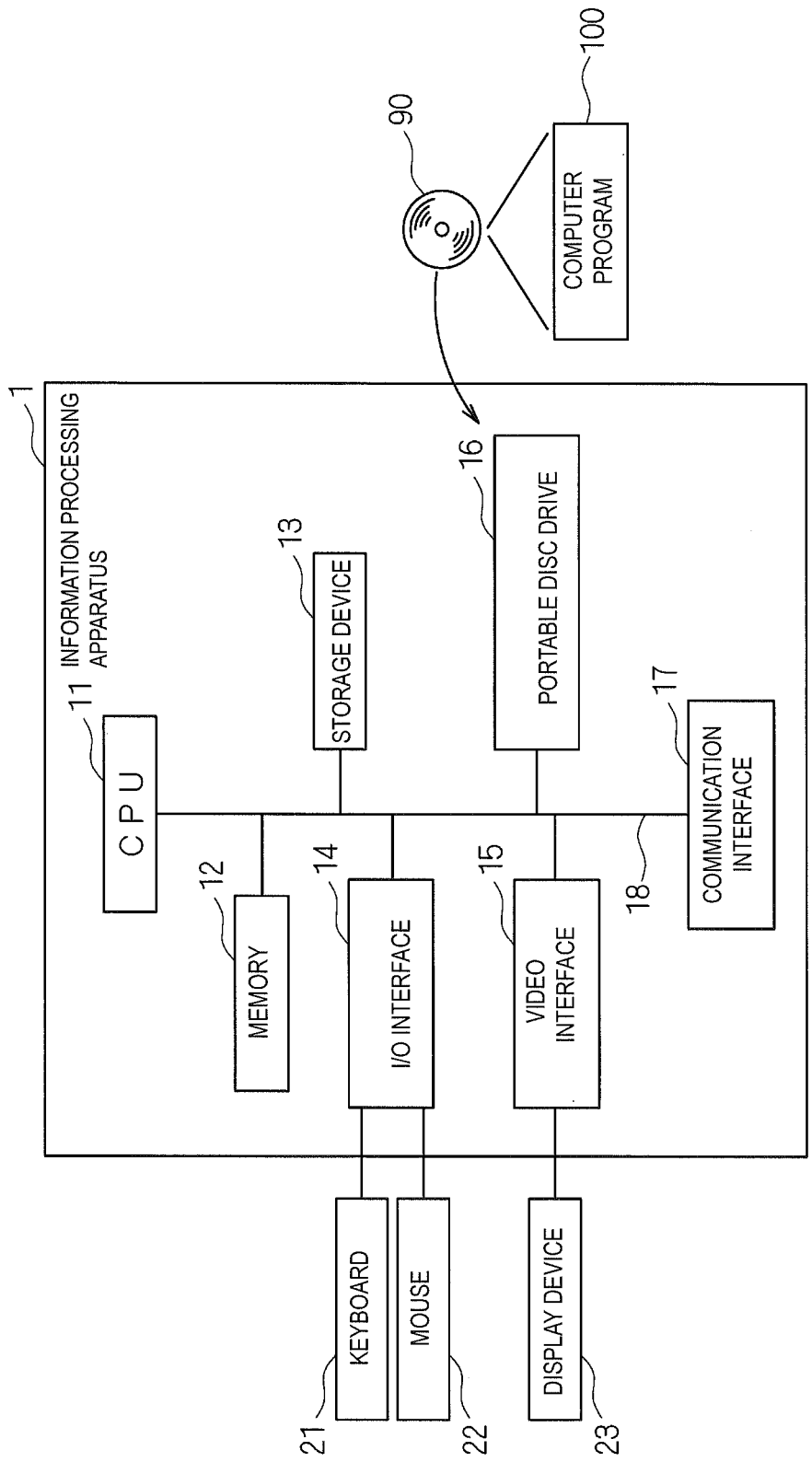
FIG. 1 is a block diagram schematically illustrating a configuration of an information processing apparatus according to an embodiment of the present disclosure.

Methods such as value iteration, policy iteration, and linear programming have difficulty in application to general problems because the size of solvable problems is quite limited. The method using the special structure described above is also disadvantageous in that complicated processing for computing an inverse matrix poses a size constraint on problems to which the method is applicable.

The present disclosure provides a method, an apparatus, and a computer program for determining an optimum policy with a cyclic Markov decision process more efficiently than existing computing methods.

One embodiment provides a method that determines an optimum policy by using a Markov decision process in which T (T is a natural number) subspaces each having at least one state having a cyclic structure, including: identifying subspaces that are part of a state space; receiving selection of a t-th (t is a natural number, $t \le T$) subspace among the identified subspaces; computing a probability of, and an expected value of a cost of, reaching from one or more states in the selected t-th subspace to one or more states in the t-th subspace in a following cycle; and recursively computing a Value and an expected value of a cost based on the computed probability and expected value of the cost, in a sequential manner starting from a (t−1)-th subspace.

A method according to a second embodiment includes a method of selecting of a subspace having fewest states among the T subspaces as the t-th subspace.

A method according to a third embodiment computes an average value of values and an average value of expected values of cost of one or more states in the t-th subspace.

A method according to a fourth embodiment computes a value variable for each of the T subspaces to optimize the Markov decision process.

Furthermore, a fifth embodiment provides an apparatus that determines an optimum policy by using a Markov decision process in which T (T is a natural number) subspaces each having at least one state having a cyclic structure, including: a subspace identifying unit that identifies subspaces that are part of a state space; a selection unit that selects the t-th (t is a natural number, t≤T) subspace among the identified subspaces; a probability and cost computing unit that computes a probability of, and an expected value of a cost of, reaching from one or more states in the selected t-th subspace to one or more states in the t-th subspace in a following cycle; and a recursive computing unit that recursively computes a Value and an expected value of a cost based on the computed probability and expected value of the cost, in a sequential manner starting from a (t−1)-th subspace.

An apparatus according to a sixth embodiment includes a method of selection of a subspace having fewest states among the T subspaces as the t-th subspace.

An apparatus according to a seventh embodiment computes an average value of values and an average value of expected values of cost of one or more states in the t-th subspace.

An apparatus according to an eighth embodiment computes a value variable for each of the T subspaces to optimize the Markov decision process.

A ninth embodiment provides a computer program executable in an apparatus that determines an optimum policy by using a Markov decision process in which T (T is a natural number) subspaces each having at least one state having a cyclic structure, the computer program causing the apparatus to function as: subspace identifying means for identifying subspaces that are part of a state space; selection means for selecting the t-th (t is a natural number, t≤T) subspace among the identified subspaces; probability and cost computing means for computing a probability of, and an expected value of a cost of, reaching from one or more states in the selected t-th subspace to one or more states in the t-th subspace in a following cycle; and recursive computing means for recursively computing a Value and an expected value of a cost based on the computed probability and expected value of the cost, in a sequential manner starting from a (t−1)-th subspace.

The present embodiments enables a cyclic Markov decision process to determine optimum policies for problems having large sizes and determine optimum policies for problems that cannot be solved by conventional algorithms such as value iteration, policy iteration, and linear programming.

An apparatus using a cyclic Markov decision process to determine an optimum policy that minimizes an average cost with reduced computational load according to an embodiment of the present disclosure will be described below in detail with reference to drawings. It will be understood that the embodiment described below is not intended to limit the present disclosure in the scope of claims and that not all of the combinations of features described in the embodiment are essential to the solution to the problems.

The present disclosure can be carried out in many different modes and should not be interpreted as being limited to the specifics of the embodiment described. Throughout the embodiment, like element are given like reference numerals.

While an information processing apparatus in which a computer program is installed in a computer system will be described with the embodiment given below, part of the present disclosure can be implemented as a computer-executable computer program as will be apparent to those skilled in the art. Accordingly, the present disclosure can be implemented by hardware as an apparatus determining an optimum policy that minimizes an average cost with a reduced computational load for a cyclic Markov decision process, or software, or a combination of software and hardware. The computer program can be recorded on any computer-readable recording medium, such as a hard disk, a DVD, a CD, an optical storage device, or a magnetic storage device.

The embodiments of the present disclosure enable a cyclic Markov decision process to determine optimum policies for problems having large sizes and determine optimum policies for problems that cannot be solved by conventional algorithms such as value iteration, policy iteration, and linear programming. It should be noted that a Markov decision process is cyclic if a state space can be divided into T subspaces (where T is a natural number) and transition from the t-th subspace (where t is a natural number, t≤T) can be made only to the (t+1)-st subspace using any policy, where the (T+1)-st subspace is equal to the first subspace. In this case, the Markov decision process is defined as having a cycle with the length T and the t-th subspace can be translated into the state space at time t.

FIG. 1 is a block diagram schematically illustrating a configuration of an information processing apparatus according to an embodiment of the present disclosure. The information processing apparatus 1 according to the embodiment of the present disclosure includes at least a CPU (Central Processing Unit) 11, a memory 12, a storage device 13, an I/O interface 14, a video interface 15, a portable disc drive 16, a communication interface 17, and an internal bus 18 interconnecting the hardware components given above.

The CPU 11 is connected to the hardware components of the information processing apparatus 1 given above through the internal bus 18, controls operations of the hardware components given above, and executes various software functions according to a computer program 100 stored on the storage device 13. The memory 12 is implemented by a volatile memory such as an SRAM or an SDRAM, in which a load module of the computer program 100 is loaded when the computer program 100 is executed and temporary data generated during execution of the computer program 100 is stored.

The storage device 13 is implemented by a storage device such as a built-in fixed storage device (a hard disk) or ROM. The computer program 100 stored in the storage device 13 has been downloaded from a portable storage medium 90, such as a DVD or a CD-ROM, on which information such as programs and data are stored, to the storage device 13 by the portable disc drive 16, and is loaded into the memory 12 from the storage device 13 when the computer program 100 is executed. The computer program 100 may be downloaded from an external computer connected through the communication interface 17, of course.

The communication interface 17 is connected to the internal bus 18 and is capable of sending and receiving data to and from an external computer or other device by connecting to an external network such as the Internet, a LAN, or a WAN.

The I/O interface 14 is connected to input devices such as a keyboard 21 and a mouse 22 and receives input data. The video interface 15 is connected to a display device 23 such as a CRT display or a liquid-crystal display and displays a given image.

Figure 2:
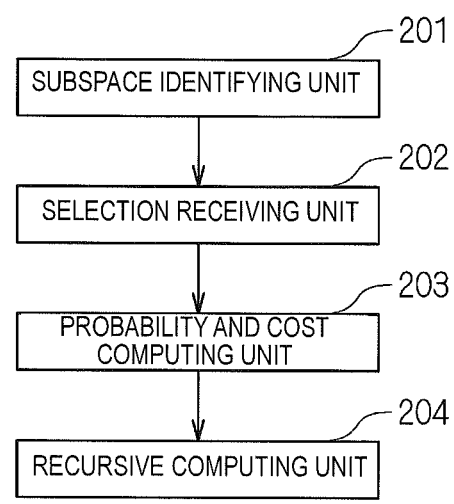
FIG. 2 is a functional block diagram illustrating the information processing apparatus according to the embodiment of the present disclosure.

FIG. 2 is a functional block diagram of the information processing apparatus 1 according to the embodiment of the present disclosure. In FIG. 2, a subspace identifying unit 201 of the information processing apparatus 1 identifies T subspaces (T is a natural number) which are part of a state space. Equation 1 is an equation written with a t-th (t is a natural number, t≤T) subspace (subspace t) and is solvable using policy evaluation of a conventional method with a cyclic Markov decision process.

$$\begin{pmatrix} c_1 \\ c_2 \\ \vdots \\ c_{T-1} \\ c_T \end{pmatrix} - g \begin{pmatrix} 1 \\ 1 \\ \vdots \\ 1 \\ 1 \end{pmatrix} + \begin{pmatrix} 0 & P_{1,2} & 0 & \cdots & 0 \\ \vdots & 0 & P_{2,3} & \ddots & \vdots \\ \vdots & & \ddots & \ddots & 0 \\ 0 & & & \ddots & P_{T-1,T} \\ P_{T,1} & 0 & \cdots & \cdots & 0 \end{pmatrix} \begin{pmatrix} h_1 \\ h_2 \\ \vdots \\ h_{T-1} \\ h_T \end{pmatrix} = \begin{pmatrix} h_1 \\ h_2 \\ \vdots \\ h_{T-1} \\ h_T \end{pmatrix}$$ (Equation 1)

In Equation 1, a vector $c_t$ (t=1, ..., T) represents the cost of each state of subspace t among the T subspaces and the i-th component of the vector $c_t$ represents the cost of the i-th state of subspace t.

A matrix $P_{t,\,t+1}$ (t=1, ..., T) represents the probability of transition from each state of the subspace t to each state of the subspace t+1. The i-, j-th entry of the matrix $P_{t,\,t+1}$ represents the probability that a transition is made from the i-th state of the subspace t to the j-th state of the next subspace t+1. The matrix $P_{T,\,T+1}$ is defined to be equal to the matrix $P_{T,\,1}$.

Here, g is a variable representing a gain. The term gain as used herein refers to an average gain of the policy per a Markov decision process. A vector $h_t$=1, ..., T) is a variable representing a bias of each state of the subspace t. The bias is defined for each state. A bias from a given state represents the difference between a gain that can be obtained from the state in N operations and a gain gN that can be obtained from an average state in N operations, where N is a sufficiently large number of operations. Let the vector h be defined as a vector including T vectors ($h_1, h_2, ..., h_T$). Then, if the vector h is the solution to be found, vector h+k×vector 1 (where "vector 1" is a vector whose components are all 1, and k is an arbitrary constant) is also a solution. Solving the equation (Equation 1) means finding the variable g and the vector h.

A selection unit 202 selects the t-th subspace among identified subspaces. In this embodiment, the selection unit 202 selects of the t-th subspace that has the fewest states among the T subspaces. For simplicity of explanation, a case where t=1 will be taken as an example in the following description.

A probability and cost computing unit 203 computes the probability of, and an expected value of the cost of, going from one or more states of the selected t-th subspace to one or more states of the t-th subspace in the following cycle.

Equation 2 represents a matrix Q each of whose entries (i, j) is the probability of transition from a selected state i of the subspace (the t-th subspace) to a state outside the selected subspace to a state j of the selected subspace. Equation 2 defines a matrix Q where transition probability matrices P, each of which is a transition probability matrix from one state to the next, are multiplied one after another.

$$Q \equiv P_{1,2} P_{2,3} \cdots P_{T-1,T} P_{T,1}$$ (Equation 2)

Equation 3 defines a vector b each of whose i-th components is an expected value of cost of transition from a state i of a selected subspace (the t-th subspace) to a state outside the selected subspace to any of the states of the selected subspace.

$$b \equiv c_1 + P_{1,2}c_2 + (P_{1,2}P_{2,3})c_3 + \ldots + (P_{1,2}P_{2,3} \cdots P_{T-1,T})c_T$$ (Equation 3)

Then, the variable g representing gain and the vector $h_t$ (t=1) which is a variable representing the bias of each state of the subspace t are found by using the matrix Q (Equation 2) each of whose entries (i, j) is the probability of transition from the state i of the selected subspace (the t-th subspace) to a state outside the selected subspace to the state j of the selected subspace, and the vector b each of whose i components is an expected value of cost of transition from the state i of the selected subspace (the t-th subspace) to a state outside the selected subspace to any of the states of the selected subspace, as the solutions of the equation (Equation 4) given below.

$$(I - Q|T1)\begin{pmatrix} h_1 \\ g \end{pmatrix} = b$$ (Equation 4)

In Equation 4, the matrix I represents an identity matrix and the vector 1 represents a vector whose components are all 1. The variable g, which represents gain, and the vector $h_t$ (t=1), which is a variable representing the bias of each state of the subspace t can be found. A recursive computing unit 204 recursively computes values and expected values of costs in order from the (t−1)-th subspace on the basis of the probability and the expected value of cost that are determined by the variable g representing gain and the vector $h_t$ (t=1), which is a variable representing the bias of each state of the subspace t.

Specifically, since t=1, the vector $h_t$ (for t=T) is computed next and vectors are recursively computed one after another. That is, the vector $h_t$ (for t=T), which is the variable representing the bias of a state of the subspace t (for t=T) can be found first and the vector $h_t$ (for t=T−1), vector $h_t$ (for t=T−2), ..., vector $h_t$ (for t=2) can be found recursively in sequence as shown in Equation 5.

$$h_T = c_T - g1 + P_{T,1}h_1$$ (Equation 5)
$$h_{T-1} = c_{T-1} - g1 + P_{T-1,T}h_T$$
$$\vdots$$
$$h_2 = c_2 - g1 + P_{2,3}h_3$$

In Equation 5, the vector 1 represents a vector whose components are all 1. The vector $h_t$ of the subspace t that has the fewest states is computed first and a vector $h_t$ for another subspace is recursively computed from that vector $h_t$, rather than directly finding the vectors $h_t$ (t=, 1 ..., T) by computing an inverse matrix as in Equation 1. Accordingly, the computational load can be significantly reduced.

Figure 3:
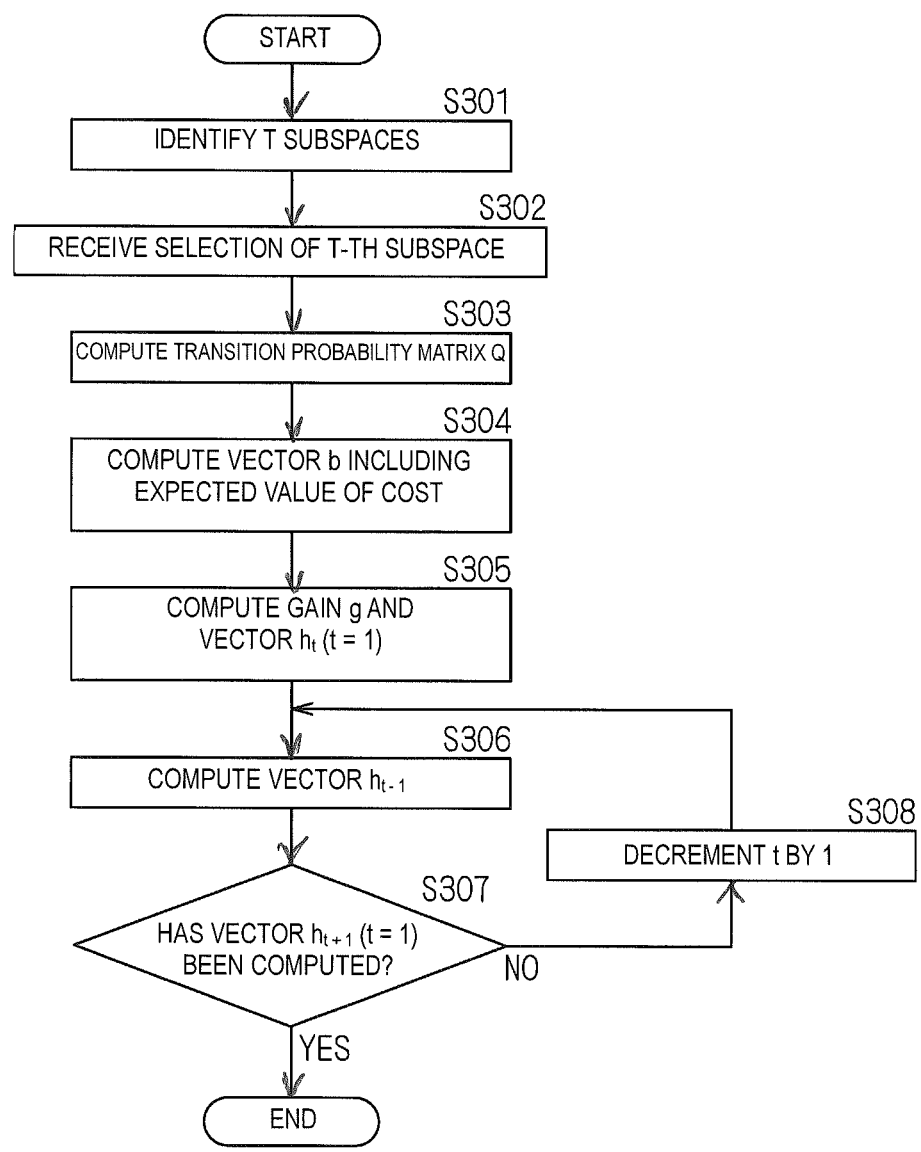
FIG. 3 is a flowchart of a process procedure performed by a CPU of the information processing apparatus according to an embodiment of the present disclosure.

FIG. 3 is a flowchart of a process procedure performed by the CPU 11 of the information processing apparatus 1 according to the embodiment of the present disclosure. In FIG. 3, the CPU 11 of the information processing apparatus 1 identifies T subspaces (T is a natural number) that are part of a state space (operation S301). The CPU 11 selects the t-th subspace (t is a natural number, t≤T) among the identified subspaces (operation S302). In this embodiment, the CPU 11 selects the t-th subspace that has fewest states among the T subspaces.

The CPU 11 computes a transition probability matrix Q for the probability of going from one or more states of the selected t-th subspace to one or more states of the t-th subspace in the following cycle (operation S303). The CPU 11 computes a vector b including, as an i-th component, an expected value of cost of going from the state i of the selected subspace (the t-th subspace) passing to a state outside the selected subspace to a state j of the selected subspace (operation S304).

The CPU 11 then uses the computed matrix Q and vector b to compute a variable g, which represents gain, and a vector $h_t$ (t=1), which is a variable representing a bias of each state of the subspace t (operation S305). The CPU 11 uses the variable g representing gain and a vector $h_t$, which is a variable representing a bias of each state of the subspace t, to compute a vector $h_{t-1}$, which is a variable representing a bias of each state of a subspace t−1 (operation S306). It should be noted that if t=1, the vector $h_{t-1}$ computed is a vector $h_0 = h_T$ because of the cyclic nature.

The CPU 11 determines whether or not the CPU 11 has computed the vector $h_{t+1}$ (t=1) (operation S307). This is done because at the point in time when computation of the vector $h_{t+1}$ is completed, vectors h for all subspaces in one cycle have been recursively computed.

If the CPU 11 determines that the vector $h_{t+1}$ has not been computed (operation S307: NO), the CPU 11 decrements the argument t of the vector h by '1' (operation S308) and returns to operation S306 to repeat the process described above. If the CPU 11 determines that the vector $h_{t+1}$ has been computed (operation S307: YES), the CPU 11 ends the process.

It should be noted that when the vector b that includes, as the i-th component, an expected value of cost of going from a state i of the selected subspace (the t-th subspace) passing to a state outside the selected subspace to any of the states of the selected subspace is defined, costs that can occur in the future may be discounted. That is, Equation 3 may be multiplied by a discount rate λ (0<λ<1) according to a state transition. Equation 6 defines the vector b that includes, as the i-th component, an expected value of cost of going from a state i of the selected subspace (the t-th subspace) passing to a state outside the selected subspace to any of the states of the selected subspace.

$$b \equiv c_1 \lambda P_{1,2} c_2 + \lambda^2 (P_{1,2} P_{2,3}) c_3 + \ldots + \lambda^{T-1} (P_{1,2} P_{2,3} \ldots P_{T-1,T}) c_T \quad \text{(Equation 6)}$$

In this case, a variable g representing gain and a vector $h_t$ (t=1), which is a variable representing a bias of each state of the subspace t, are found as solutions of the equation (Equation 7) using a matrix Q (Equation 2) each of whose entries (i, j) is the probability of transition from a state i of a selected subspace (the t-th subspace) to a state outside the selected subspace to a state j of the selected subspace and a vector b each of whose i components is an expected value of cost of transition from a state i of a selected subspace (the t-th subspace) passing to a state outside the selected subspace to any of the states of the selected subspace.

$$(I-Q)h_1 = b \quad \text{(Equation 7)}$$

In Equation 7, the matrix I represents an identity matrix. The variable g, which represents gain, and the vector $h_t$ (t=1), which is a variable representing the bias of each state of the subspace t can be found. A recursive computing unit 204 recursively computes values and expected values of costs in order from the (t−1)-th subspace on the basis of the probability and the expected value of cost that are determined by the variable g representing gain and the vector $h_t$ (t=1), which is a variable representing the bias of each state of the subspace t.

Specifically, since t=1, the vector $h_t$ (t=T) is computed next and vectors are recursively computed one after another. That is, the vector $h_t$ (t=T), which is the variable representing the bias of a state of the subspace t (t=T) can be found first and the vector $h_t$ (t=T−1), vector $h_t$ (t=T−2), ..., vector $h_t$ (t=2) can be found recursively in sequence as shown in Equation 8.

$$h_T = c_T + \lambda P_{T,1} h_1 \quad \text{(Equation 8)}$$
$$h_{T-1} = c_{T-1} + \lambda P_{T-1,T} h_T$$
$$\vdots$$
$$h_2 = c_2 + \lambda P_{2,3} h_3$$

Unlike Equation 5, Equation 8 does not use the gain g. This is because the cost that will occur in the future has been discounted previously and therefore gain can be considered to be 0 (zero).

In this way, this embodiment enables a cyclic Markov decision process to determine optimum policies for problems having large sizes and determine optimum policies for problems that cannot be solved by conventional algorithms such as value iteration, policy iteration, and linear programming.

The gain determined in the embodiment described above is the average gain g per state transition of the Markov decision process and it is assumed that the gain can be uniquely determined for all states. However, in real problems, the gain can vary from state to state. If this is the case, the gain g is computed as a vector for each subspace t. That is, a gain vector g is computed as a value variable for each of T subspaces (T is a natural number) to optimize a Markov decision process.

Therefore, the variable vector $g_t$ (t=1) representing gain and the vector $h_t$ (t=1) which is a variable representing the bias of each state of the subspace t are found by using the matrix Q (Equation 2) each of whose entries (i, j) is the probability of transition from the state i of the selected subspace (the t-th subspace) passing to a state outside the selected subspace to the state j of the selected subspace, and the vector b each of whose i components is an expected value of cost of transition from the state i of the selected subspace (the t-th subspace) passing to a state outside the selected subspace to any of the states of the selected subspace, as the solutions of the equation (Equation 9) given below.

$$\left( \frac{I-Q}{O} \middle| \frac{TI}{I-Q} \right) \binom{h_1}{g_1} = \binom{b}{0} \quad \text{(Equation 9)}$$

In Equation 9, the matrix I represents an identity matrix. The variable vector $g_t$ (t=1) representing gain and the vector $h_t$ (t=1), which is a variable representing the bias of each state of the subspace t can be found. The recursive computing unit 204 recursively computes values and expected values of costs in order from the (t−1)-th subspace on the basis of the probability and the expected value of cost that are determined by the variable vector $g_t$ (t=1) representing gain and the vector $h_t$ (t=1), which is a variable representing the bias of each state of the subspace t.

Specifically, since t=1, the vector $g_t$ (t=T) is computed next and gain vectors are recursively computed in sequence. That is, a gain vector $g_t$ (t=T) of the subspace t (t=T) can be computed first. The gain vector $g_t$ (t=T) is then used to compute a vector $h_t$ (t=T). Then a gain vector $g_t$ (t=T−1) and a vector $h_t$ (t=T−1), and a gain vector $g_t$ (t=T−2) and a vector $h_t$ (t=T−2) are recursively computed in sequence. In this way, pairs of gain vector $g_t$ and vector $h_t$ can be recursively computed in sequence as shown in Equation 10.

$$g_T = P_{T,1} g_1 \qquad h_T = c_T - g_T + P_{T,1} h_1$$
$$g_{T-1} = P_{T-1,T} g_T \quad h_{T-1} = c_{T-1} - g_{T-1} + P_{T-1,T} h_T$$
$$\vdots \qquad\qquad \vdots$$
$$g_2 = P_{2,3} g_3 \qquad h_2 = c_2 - g_2 + P_{2,3} h_3$$

(Equation 10)

FIG. 4 shows the results of the above-described algorithm applied to problems that cannot be solved easily by conventional algorithms such as value iteration, policy iteration, and linear programming. FIG. 4 is a table comparing computational processing times required for determining an optimum policy using a Markov decision process on the information processing apparatus 1 according to the embodiment of the present disclosure.

In FIG. 4, the size of the problem to be solved is represented by the number of states multiplied by the number of state-action pairs. CPLEX, which is a so-called general-purpose optimization engine, can solve the problems up to problem 4 but cannot solve problems of sizes larger than problem 5. Policy Iteration, which is a well-known algorithm, can solve problems of larger sizes.

However, it takes a computational processing time of 20078 seconds, or nearly 5 hours, for the algorithm to solve problem 7, which is too long as the time for determining a policy in reality. In contrast, the algorithm according to this embodiment can determine an optimum policy for problem 7, which has the largest size, in a little more than three minutes. It can be seen that the larger the size of the problem, the bigger the increase of the speed of computational processing is. Therefore, the method according to this embodiment can more significantly reduce computational load for solving larger size problems and therefore can be applied to problems having larger sizes.

The above-described method according to this embodiment which more efficiently determines an optimum policy than the existing algorithms is applicable to a power generation plan at an electric power utility company. Assume, for example, a power generation plan to determine 15 minutes in advance the amount of electric power to be generated in the next 30 minutes and to determine the amount of electric power to be charged and discharged for an electric storage every 3 minutes. In this case, there will be 30 minutes/3 minutes=10 cycles, namely, T=10.

A state space is divided into subspaces, each of which represents the "state" at time t. A transition from a subspace at time t occurs only to a subspace at time (t+1). It is assumed here that the "state" is defined by time t, the difference x between a planned amount of electric power and the amount of electric power used, the amount of stored electric power y, and the preset target amount of electric power z.

Time t is any of 1, 2, . . . , T, x represents the difference between the planned amount of electric power and the amount of electric power actually used from time 0 to time t within the cycle T, y represents the amount of electric power stored in the electric storage, and z represents the difference between the planned amount of electric power determined at time t=5 and the estimated amount of electric power to be used during the next 30 minutes.

Using a Markov decision process for the model described above, an optimum action for each state, for example the amount of electric power to be charged and discharged during the next 3 minutes can be determined, and the amount of electric power to be generated during the next 30 minutes can be determined at time t=5.

Matrix $P_{t,\,t+1}$ in Equation 1 represents a matrix each of whose entries is the probability of a transition from the state at time t to the state at time t+1. The vector $c_t$ represents the cost of each state at time t. The cost in this model represents a cost equivalent to electric power loss during the next 3 minutes due to a charging efficiency of less than 1 if the action is charging, or a cost that occurs according to the difference between the planned amount of electric power and the amount of electric power actually used, in addition to the power loss cost due to charging when t=T. The cost that occurs according to the difference between the planed amount of electric power and the amount of electric power actually used is for example the cost of purchasing additional electric power or a penalty due to surplus electric power.

The present disclosure is not limited to the exemplary embodiment described above. Various modifications and improvements can be made without departing from the spirit of the present disclosure. For example, while the values and expected values of costs of one or more states of the t-th subspace are computed in the embodiment described above, the average of the values and the average of costs may be computed as typical values.

The invention claimed is:

1. An apparatus for determining an optimum policy by using a Markov decision process in which T subspaces each have at least one state, comprising:

a processor implemented subspace identifying unit that identifies T subspaces that are part of a fixed state space, T being a natural number, the identified T subspaces being in sequence, the Markov decision process being cyclic by having the (T+1)-th subspace of the T subspaces equal to the first subspace of the T subspaces;

a processor implemented election unit that selects the t-th subspace among the identified T subspaces, t being a natural number that is less than or equal to T;

a processor implemented probability and cost computing unit that computes a probability of, and an expected value of a cost of, reaching from one or more states in the selected t-th subspace to one or more states in the t-th subspace in a next cycle; and a processor implemented recursive computing unit that recursively computes a value and an expected value of a cost based on the computed probability and expected value of the cost, in a sequential and decrementing manner starting from the (t−1)-th subspace to the (t−2)-th subspace and so forth down to the (t+1)-th subspace, via the first subspace and the T-th subspace, wherein selection of a subspace having fewest states among the T subspaces is received as the t-th subspace.

2. The apparatus according to claim 1, wherein an average value of values and an average value of expected values of cost of one or more states in the t-th subspace are computed.

3. The apparatus according to claim 1, wherein a gain vector for each of the T subspaces is computed to optimize the Markov decision process.

4. A computer program product comprising a computer readable storage medium having computer readable code stored thereon that, when executed by a computer, implement a method for determining an optimum policy by using a Markov decision process in which T subspaces each have at least one state, the method comprising:
- Identifying T subspaces that are part of a state space, T being a natural number, the identified T subspaces being in sequence, the Markov decision process being cyclic by having the (T+1)-th subspace of the T subspaces equal to the first subspace of the T subspaces;
- selecting the t-th subspace among the identified T subspaces, t being a natural number that is less than or equal to T;
- computing a probability of, and an expected value of a cost of, reaching from one or more states in the selected t-th subspace to one or more states in the t-th subspace in a next cycle; and
- recursively computing a value and an expected value of a cost based on the computed probability and expected value of the cost, in a sequential and decrementing manner starting from the (t−1)-th subspace to the (t−2)-th subspace and so forth down to the (t+1)-th subspace, via the first subspace and the T-th subspace, wherein selection of a subspace having fewest states among the T subspaces is received as the t-th subspace.

5. The computer program product according to claim 4, wherein an average value of values and an average value of expected values of cost of one or more states in the t-th subspace are computed.

6. The computer program product according to claim 4, wherein a gain vector for each of the T subspaces is computed to optimize the Markov decision process.

* * * * *